United States Patent [19]

Mouri et al.

[11] Patent Number: 5,895,796
[45] Date of Patent: Apr. 20, 1999

[54] ION ADSORBENT

[75] Inventors: Motoya Mouri, Suita; Toshio Kimura, Nishinomiya; Takeshi Ueda, Suita, all of Japan

[73] Assignee: Takeda Chemical Industries, Ltd., Osaka, Japan

[21] Appl. No.: 08/909,069

[22] Filed: Aug. 14, 1997

[30] Foreign Application Priority Data

Aug. 14, 1996 [JP] Japan ................... 8-233625
Feb. 27, 1997 [JP] Japan ................... 9-062258

[51] Int. Cl.⁶ ............... B01J 20/26; B01J 20/06; B01J 41/12
[52] U.S. Cl. ............ 524/413; 210/660; 210/661; 210/681; 210/683; 524/401; 524/431
[58] Field of Search ............... 524/401, 413, 524/431; 210/681, 683, 660, 661

[56] References Cited

U.S. PATENT DOCUMENTS

| | | | |
|---|---|---|---|
| 4,235,972 | 11/1980 | Jones | 521/28 |
| 4,400,305 | 8/1983 | Takeuchi | 252/430 |
| 4,771,080 | 9/1988 | Ibuki | 521/56 |
| 4,868,055 | 9/1989 | Sakata | 428/402 |

*Primary Examiner*—Fred Zitomer
*Attorney, Agent, or Firm*—Wenderoth, Lind & Ponack, LLP

[57] ABSTRACT

By using a polymer containing a dichloroethylene structure derived from a vinylidene chloride monomer in the molecule in place of an unsaturated polyester and an urethane resin, there can be obtained an excellent adsorbent which has improved workability in case of granulation and high strength, and causes little deterioration of its ion exchange capacity even after a large number of regenerations.

15 Claims, 1 Drawing Sheet

ION ADSORBENT

BACKGROUND OF THE INVENTION

1. Field of Invention

The present invention relates to an ion adsorbent capable of efficiently removing harmful ions in water, wherein the processability and yield in the granulation are improved.

2. Description of Related Art

With the severe regulations for environmental safeguard, an adsorbent capable of removing phosphate ions and fluoride ions effectively in waste water has been required. However, since water is a good solvent for many compounds, particularly salts, it is not easy to separate and remove the compounds and ions, which were once dissolved in water, from an aqueous solution.

As a method of separating/removing harmful metal ions such as copper ions from an aqueous solution containing them, there has been suggested a method of recovering copper ions as metal copper using a metal having ionization tendency larger than that of copper, such as aluminum (Japanese Patent Kokai Nos. 68428/1976 and 26366/1977). However, it is difficult to recover copper from an aqueous solution containing copper ions in low concentration such as 10 ppm or less.

On the other hand, as a method of removing phosphate ions as one of causative substances for eutrophication, there is a so-called flocculation sedimentation method, comprising adding chemicals containing metal ions such as calcium ions, aluminum ions, etc. to waste water containing phosphate ions to remove the phosphate ions as hardly soluble phosphates. Nevertheless, this method, which produces large quantities of sludge and therefore causes the secondary environmental pollution, is not necessarily regarded as a satisfactory one.

It has been known that hydrates of titanium oxide, zirconium oxide and tin oxide possess the property of ion exchange and, for example, in acidic solutions, through the fixing of hydrogen ions, $H^+$, become anion exchangers with a capacity for absorbing phosphate ions, fluoride ions, sulphate ions, nitrate ions, nitrite ions, chloride ions, arsenate ions, arsenite ions, chromate ions and molybdate ions. It has also been known that in an alkaline solution, the hydrates function as cation exchangers, through the fixing of hydroxyl ions, $OH^-$. In order to improve the strength of the adsorbent with paying attention to the ion exchange property of these metal oxide hydrates, there is suggested an adsorbent which is prepared by mixing hydrated ferrites of titanium, zirconium or tin with an unsaturated polyester resin or a polyurethane resin and curing the mixture (Japanese Patent Kokai Nos. 118734/1981 and 50543/1982).

Use of these metal hydrated ferrites packed in a column as powders causes large pressure loss and clogging, and further consumes a great deal of times, efforts and costs for a treatment after ion adsorption, for example, filtration, separation and regeneration of the adsorbent. An adsorbent prepared by mixing powders of a metal hydrated sulfate with an unsaturated polyester resin, followed by molding has such drawbacks that the intrinsic ion exchange capacity of the metal hydrated ferrite is not sufficiently exhibited and the adsorption rate becomes slow. Both cases had problems in view of the efficiency of removing ions and facilitation at working. Furthermore, since these resins are generally used in combination with an organic solvent, the working environment was also poor.

SUMMARY OF THE INVENTION

Therefore, the present inventors have found that, by using vinylidene chloride resin in place of an unsaturated polyester resin and a urethane resin, the workability of granulation is improved and an adsorbent having excellent ion exchange capacity. Furthermore, the present inventors have intensively studied, thereby accomplishing the present invention.

That is, the present invention provides:

(1) an ion adsorbent, which is prepared by curing a composition comprising at least one hydrated ferrite of titanium, zirconium and tin, and a polymer having a dichloroethylene structure derived from a vinylidene chloride monomer in the molecule;

(2) an ion adsorbent in (1), wherein the composition further comprises at least one hydrated oxide of titanium, zirconium, tin and iron;

(3) an ion adsorbent in (1) or (2), wherein the amount of the polymer in the ion adsorbent is from 5 to 50% by weight;

(4) an ion adsorbent in any one of (1) to (3), wherein the content of the dichloroethylene moiety in the polymer molecule is from 30 to 99% by weight;

(5) an ion adsorbent in (1) or (2) which is used for adsorption of phosphate ion and/or fluoride ion;

(6) an adsorbent in (1) or (2), wherein the composition is cured at 25–120° C.;

(7) an adsorbent in (1) or (2), which has a spherical form; and (8) a method for regenerating an ion adsorbent, which comprises treating the ion adsorbent of (1) having absorbed ion with an aqueous alkaline solution.

Explanation of the Symbols

Figure 1:
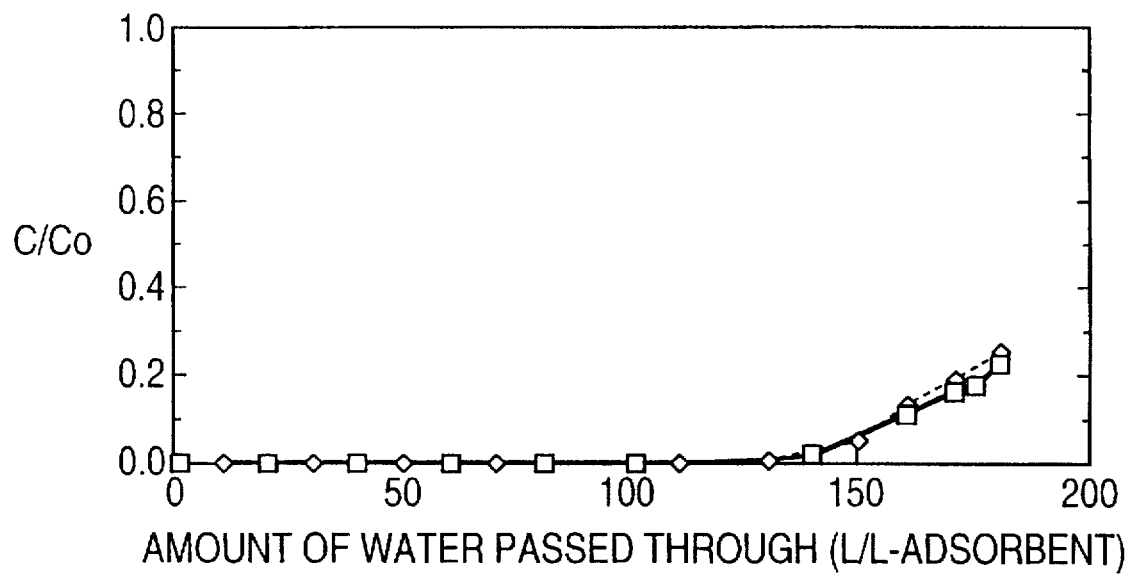
FIG. 1 is a phosphate ion adsorption/break-through curve of a new ion adsorbent of Test Sample 2-1, in which the ordinate indicates an outlet concentration (C)/inlet concentration (Co) and the abscissa indicates an amount of water passed through (L/L-adsorbent)

—△—: Crushed product according to a conventional procedure (average particle diameter: 0.5 mm)

—○—: Spherical product having an average particle diameter of 1 mm

—◇—: Crushed product having an average particle diameter of 0.5 mm

—○—: New product

... ◇ ... : Regenerated product

DETAILED DESCRIPTION OF THE INVENTION

The hydrated ferrite of titanium, zirconium and/or tin or a mixture of such hydrated ferrites(s) and at least one hydrated oxide of titanium, zirconium, tin and/or iron, which is used in the production of the adsorbent of the present invention can be produced, for example, by the following procedure.

To a solution containing at least one metal salt of titanium, zirconium or tin is added a ferrous salt in an amount equivalent to 0.2 to 11 times, the molar quantity if the metal ions contained in the solution, thereafter an alkali is added to maintain the pH of the solution at about 6 or more, preferably about 7 to 12. Then, after increasing the temperature of the solution up to 30 to 100° C., if necessary, a free oxygen-containing gas or an oxidizing gas such as ozone is blown into the solution or an oxidizing agent such as hydrogen peroxide is added to the solution thereby to produce a precipitate of a hydrated ferrite.

The resulting precipitate is filtered off, washed with water and then dried. Drying is carried out by means of air-drying or at a temperature not higher than about 150° C., preferably not higher than about 90° C. for about 1 to 20 hours. The water content after drying preferably falls within the range of about 6 to 30% by weight.

By this procedure, at least one hydrated ferrite of titanium, zirconium and/or tin or a mixture thereof with at least one hydrated oxide of titanium, zirconium, tin and/or iron is obtained.

Explaining more specifically, at least one hydrated ferrite of titanium, zirconium and/or tin or a mixture thereof with at least one hydrated oxide of iron is produced in the same manner as that mentioned above except that there is added to the solution containing metal ions prepared by dissolving at least one salt of titanium, zirconium and/or tin a ferrous salt in the amount equivalent to not less than about 2 to 11 times, the molar quantity of the metal ions contained in the solution.

The term "hydrated iron oxide" is used herein to denote a hydrate (such as a monohydrate, dihydrate, trihydrate, tetrahydrate, etc.) of an iron oxide, such as FeO, $Fe_2O_3$ and $Fe_3O_4$. The proportion of hydrated ferrite to hydrated iron oxide is such that the hydrated ferrite may constitute from 24 to 100% by weight, preferably from 50 to 99% by weight, of the combined amount of the hydrated ferrite and the hydrated iron oxide.

A mixture consisting of at least one hydrated ferrite of titanium, zirconium and/or tin and at least one hydrated ferrite of titanium, zirconium and/or tin is produced in the same manner as the above-mentioned procedure except that there is added to the solution containing metal ions prepared by dissolving at least one salt of titanium, zirconium and/or tin a ferrous salt in the amount equivalent to not less than about 0.2 times, but less than about twice, the molar quantity of the metal ions contained in the solution. In this case, the hydrated ferrite constitutes from 20 to 100% by weight, preferably from 50 to 99% by weight.

The term "hydrated titanium oxide" is used herein to denote a compound represented by the general formula:

$$TiO_2 \cdot nH_2O$$

(wherein n is a number of 0.5 to 2.0).

Specific examples of hydrated titanium oxide include:

$$TiO_2 \cdot H_2O(TiO(OH)_2), TiO_2 \cdot 2H_2O(Ti(OH)_4) \text{ and } TiO_2 \cdot nH_2O$$

(wherein n is a number of 1.5 to 2.0).

The term "hydrated zirconium oxide" is used herein to denote a compound represented by the general formula:

$$ZrO_2 \cdot nH_2O$$

(wherein n is a number of 0.5 to 2.0).

Specific examples of hydrated zirconium oxide include:

$$ZrO_2 \cdot H_2O(ZrO(OH)_2), ZrO_2 \cdot 2H_2O(Zr(OH)_4) \text{ and } ZrO_2 \cdot nH_2O$$

(wherein n is a number of 1.5 to 2.0).

The term "hydrated tin oxide" is used herein to denote a compound represented by the general formula:

$$SnO_2 \cdot nH_2O$$

(wherein n is a number of 0.5 to 2.0).

Specific examples of hydrated tin oxide include:

$$SnO_2 \cdot H_2O(SnO(OH)_2), SnO_2 \cdot 2H_2O(OH)_4) \text{ and } SnO_2 \cdot nH_2O$$

(wherein n is a number of 1.5 to 2.0).

Examples of the metal salts of titanium, zirconium and tin, which may be used in the above-mentioned production procedures, include titanium tetrachloride ($TiCl_4$), titanium sulfate ($Ti(SO_4)_2$), titanyl sulfate ($TiO(SO_4)$), zirconium oxychloride ($ZrOCl_2$), zirconium tetrachloride ($ZrCl_4$), zirconium nitrate ($Zr(NO_3)_4$), zirconium sulfate ($Zr(SO_4)_2$), zirconium acetate ($Zr(CH_3COO)_4$), tin tetrachloride ($SnCl_4$), tin nitrate ($Sn(NO_3)_4$) and tin sulfate ($Sn(SO_4)_2$). These metal salts may be, for example, hydrated salts such as $Zr(SO_4)_2 \cdot 4H_2O$. These metal salts are normally used as about 0.05 to 2.0 mol % solutions in 1 liter.

Examples of ferrous salts include ferrous sulfate ($FeSO_4$), ferrous nitrate ($Fe(NO_3)_2$) and ferrous chloride ($FeCl_2$). These may also be, for example, hydrated salts such as $Fe(SO_4) \cdot 7H_2O$. These ferrous salts are normally added in the solid state but may be done in the form of a solution.

Examples of alkalis include sodium hydroxide, potassium hydroxide, calcium hydroxide, ammonia and sodium carbonate. These are normally used as about 5 to 20 weight % aqueous solutions.

In the case where an oxidizing gas is blown, the duration of the blowing depends upon the type of oxidizing gas and is normally in the range of about 1 to 3 hours.

As an oxidizing agent, for example, there may be used hydrogen peroxide, sodium hypochloride or potassium hypochloride.

The hydrated ferrite or mixture thereof with a hydrated oxide may be in any form and particles with a particle size of normally from 1 to 500 μm, preferably from 2 to 250 μm, more preferably from 3 to 100 μm, are used in terms of their processability during mixing with a resin or adsorption capacity, as mentioned hereinafter.

The polymer having a dichloroethylene structure derived from a vinylidene chloride monomer in the molecule which is used in the present invention may be, for example, a homopolymer of vinylidene chloride and a copolymer of vinylidene chloride with the other polymerizable monomer.

The average polymerization degree of the homopolymer of vinylidene chloride or the copolymer of polymerizable monomer containing the vinylidene chloride monomer, which is used in the present invention is normally from 100 to 100,000, preferably from 200 to 50,000, more preferably from 500 to 20,000.

The other copolymerizable monomer in the production of the vinylidene chloride copolymer may be any known monomer. Typical examples thereof include vinyl compounds such as vinyl chloride, vinyl acetate and alkyl vinyl ether; and acrylic and methacrylic compounds such as acrylonitrile, acrylic acid, acrylic acid halide, acrylate, methacrylic acid and methacrylate. These copolymerizable monomers can be used in combination with each other, optionally.

The homopolymerization and copolymerization of vinylidene chloride can be carried out by per se known procedure. The content of the dichloroethylene moiety |—C($Cl$)$_2$—$CH_2$—| derived from vinylidene chloride constituting the vinylidene chloride copolymer is preferably from 30 to 99% by weight, preferably from 50 to 98% by weight, more preferably from 60 to 95% by weight.

The proportion of the polymer having the dichloroethylene structure in the ion adsorbent of the present invention is from 5 to 50% by weight, preferably from 7 to 45% by weight, more preferably from 10 to 30% by weight, based on the ion adsorbent.

The polymer to be used may be those prepared by appropriately adding known stabilizers for preventing deterioration due to heat or light, antioxidants, ultraviolet absorbers, auxiliaries for enhancing moldability upon molding, plasticizers and antistatic agents, if necessary. The polymer may be in any form such as solid and liquid wherein a solid or liquid is dispersed in an liquid medium (e.g. emulsion, suspension, slurry, etc.), or may be in the form wherein a part of the above-mentioned vinylidene and the other copolymerization component is remained without being polymerized or the part may be added if necessary.

The procedure for mixing a hydrated ferrite of the metal or a mixture thereof with a hydrated oxide of a metal with a polymer having a dichloroethylene structure derived from vinylidene chloride in the molecule may be, for example, a procedure of mixing a latex containing the polymer and the hydrated compound(s) by stirring at a high speed in a container equipped with a stirrer, a procedure of batch-wise or continuous mixing by the use of a kneader or a procedure of batch-wise or continuous mixing by the use of an apparatus for the solid-liquid mixing.

This mixture, that is, the composition is then cured. The curing may be carried out normally at the temperature within the range from 25 to 120° C., preferably from 40 to 110° C., particularly from 50 to 90° C. The curing time is from about 10 minutes to 50 hours. A cured matter may be optionally granulated after crushing by a hammer mill, roll crusher, etc.

In that case, the average particle size in diameter is from about 3 to 120 mesh, preferably from about 24 to 80 mesh. Alternatively, the resulting mixture, for example, may be continuously extruded in the cylindrical form on a steel belt conveyor or similar device, and held on the steel belt conveyor for the period enough to allow the mixture to cure, followed by cutting the cured, cylindrical-formed adsorbent to the appropriate length.

Further, the adsorbent may be formed into spherical shape by the use of a saucer-type rolling granulator or a centrifugal fluidized coating granulator by feeding fine particles of the hydrated compound(s) or other material(s) to act as nuclei and by simultaneously supplying the hydrated compound(s) and the latex to effect granulation. Examples of the other materials suitable for nuclei are water-insoluble ones such as clay minerals, silica, alumina, zeolite, oxides and silicates of various metals, carbonaceous materials, e. g. activated carbon and molded resins. The materials suitable for repeated regeneration include chemical resistant ones such as alumina, zirconium oxide and zirconium silicate. The spherical adsorbents of even size can be easily obtained from the nuclei of even size. The spherical adsorbents have an advantage that they hardly clog even when using as packed in a column because of their spherical shape and uniform particle size. The particle size in diameter of the spherical adsorbent is normally 0.1 to 15.0 mm, preferably 0.3 to 10.0 mm.

The ion adsorbent according to the present invention obtained in this manner can be used as an adsorbent for a great variety of anions and cations because of large ion exchange capacity and fast adsorption rate. Particularly, the adsorbent for anions can be used as the adsorbent for phosphate ion because it adsorbs selectively phosphate ion in an acidic to neutral solution. It also adsorbs fluoride ion sufficiently. Furthermore, the adsorbent of the present invention has such characteristics that it selectively adsorbs a large amount of phosphate ions at the pH within the range from about 1 to 7 but hardly adsorbs in the alkaline side.

Accordingly, after the adsorption operation was carried out in an acidic to neutral solution (pH 1 to 7) using the adsorbent of the present invention, the adsorbent can be regenerated by desorbing phosphate ions using an alkaline solution and returning this adsorbent to neutral. For example, the initial adsorption capacity of the adsorbent can be recovered by immersing the adsorbent having adsorbed phosphate ions in a 5 weight % aqueous sodium hydroxide solution for several hours, washing with water and immersing in 0.5% by weight of sulfuric acid in several hours. Besides, even if this regeneration treatment is repeated several ten times or more, the phosphate ion adsorption capacity of the adsorbent is hardly deteriorated.

The present adsorbent with excellent mechanical strength, can withstand severe conditions of industrial application, and can be used not only in fixed-bed adsorption apparatus but also in moving-bed and fluidized-bed adsorption apparatus when the adsorption operation is conducted. Moreover, it also has excellent resistance to chemicals such as acids, alkalis, oxidizing agents, reducing agents, etc. can be subjected to repeated desorption and adsorption procedures without any deterioration, thus permitting it to be used repeatedly for a prolonged period of time. In particular, the hydrated ferrite has stable crystal lattices in which the titanium, zirconium, or tins atoms are assumed to enter into the positions to be occupied by the iron atoms of the lattices composed of the added ferrous salt to thereby form a solid solution, and such metals are stable, offering the advantage of improved elution-resistance.

The adsorbent of the present invention has magnetic properties so that it can be magnetically separated, thereby facilitating separation of the adsorbent from liquids. Furthermore, the adsorbent is produced by a simple procedure of mixing a hydrated ferrite or a mixture thereof with a hydrated oxide with a latex, followed by allowing the mixture to cure, thus providing the advantage of reduced production costs. Utilization field thereof include removal of phosphate ions from sewer, living waste water and industrial waste water, or removal of harmful ions in circulating water such as water in a water tank. For example, the adsorbent can be utilized for removing phosphate ions from treated water of a domestic portable combination treatment water-purifier tank (for 5 to 10 persons) and an intermediate- or large-sized combination treatment water-purifier tank (for 10 to several thousand persons) and waste water of a sewage treatment plant and a raw sewage treatment plant. Particularly, the adsorbent is suitable for a high-level treatment of reducing the concentration of phosphate ions to 1 mg/liter or less. Furthermore, the adsorbent is extremely effective for removing fluoride ions from waste water or cleaning waste water of a semiconductor manufacturing factory and a chemical factory, and removing arsenate ions in underground water and water for industrial use.

EXAMPLE

The following Production Example, Examples and Test Examples further illustrate the present invention in detail but are not to be construed to limit the scope thereof.

Production Example 1

Production of base adsorbent powder

One liter of a 0.15 mol aqueous solution of zirconium sulfate was prepared, the solution containing 13.7 g of zirconium metal ions. 84.0 g of ferrous sulfate crystals ($FeSO_4 \cdot 7H_2O$) were added to the solution and dissolved with stirring, the quantity being equivalent to 0.3 mol as ferrous ion. Then, a 15% solution of sodium hydroxide was added dropwise to the solution with stirring until the pH of the aqueous solution reached 10, whereby a blue-green precipitate was produced. Air was blown into the aqueous solution at a flow rate of 10 liter/hour, while warming the solution at a temperature of 50 to 80° C. Continued air blowing brought about a decrease in the pH of the aqueous solution and the pH was maintained at 9.5 to 10 by further addition of the 15% sodium hydroxide solution. Air was blown until no decrease in the pH is recognized, thereby to produce a black-colored precipitate of hydrated ferrite of zirconium. The black-colored precipitate was filtered off by suction and washed with deionized water until the filtrate became neutral, followed by drying at not higher than 70° C. The precipitate was pulverized by using an atomizer to obtain a powder of hydrated zirconium ferrite having an average particle size of 8 μm.

Example 1

To 1.5 kg of the base adsorbent powder prepared in Production Example 1 was added 600 ml of a polyvinylidene chloride latex (solid content: 50% by weight; Kurehalon DO, manufactured by Kureha Kagaku Co., Ltd.), followed by mixing sufficiently in a polyvinyl bag. This mixture was passed through a 16 mesh screen to give powder (1). Then, a latex solution (2) was prepared by adding 231 g of water to 771 g of a polyvinylidene chloride latex (solid content: 50% by weight). Into a saucer-type rolling granulator, 500 g of the powder (1) was introduced first, with rotating continuously, then 1002 g of the latex solution (2) and 1152 g of the base adsorbent powder (1) were simultaneously added little by little and the mixture was granulated to give a spherical shape product having an average particle diameter of 1 mm. This granulate was dried at 70° C. overnight to obtain a spherical ion adsorbent.

Example 2

By the same procedure as described in Example 1, the latex solution (2) and the base adsorbent powder (1) were added in a saucer-type rolling granulator in the same proportion as that in Example 1 to obtain a spherical ion adsorbent having an average particle diameter of 3 mm.

Test Example 1

The BET specific surface area (measured by Nitrogen gas adsorption method) and the apparent density (measured by Mercury penetration method) of the ion adsorbent prepared in Example 1 were determined. Furthermore, the adsorbed amount of $PO_4^{3-}$ and $F^-$ was determined in the following procedure.

$Na_3PO_4$ was dissolved in distilled water to prepare a solution containing 500 mg/liter of $PO_4^{3-}$ and solutions whose pH was adjusted to 3, 5 and 7, respectively, with a $H_2SO_4$ solution were taken as a model waste solution. To 500 ml of this solution was added 2 g of the ion adsorbent, followed by adsorption at 25° C. for 100 hours using a shaker. The concentration of $PO_4^{3-}$ in the solution after adsorption was measured by ion chromatography to determine the adsorbed amount of $PO_4^{3-}$. Furthermore, a model waste solution containing 100 mg/liter of $F^-$ was prepared by dissolving NaF in distilled water, followed by the adjustment of the pH and the similar test to determine the adsorbed amount of $F^-$. The results are shown in [Table 1].

TABLE 1

Specific surface area, apparent density, and adsorbed amount of $PO_4^{3-}$ and $F^-$ of adsorbent

| | BET specific surface area ($m^2/g$) | Apparent density (g/cc) | Adsorbed amount of $PO_4^{3-}$ (mg/g-adsorbent) | Adsorbed amount of $F^-$ (mg/g-adsorbent) |
|---|---|---|---|---|
| Example 1 | 195 | 1.59 | 107 (pH = 3) | 72.9 (pH = 3) |
| | | | 87 (pH = 5) | 59.8 (pH = 5) |
| | | | 60 (ph = 7) | 42.5 (ph = 7) |
| Example 2 | 197 | 1.51 | 102 (pH = 3) | 66.0 (pH = 3) |
| | | | 83 (pH = 5) | 52.5 (pH = 5) |
| | | | 56 (ph = 7) | 39.8 (ph = 7) |

The adsorbent after the adsorption test was immersed in a 7 weight % NaOH solution for 2 hours to desorb the adsorbed $PO_4^{3-}$ and $F^-$, and the adsorbent was washed with distilled water. Then, the absorbent was regenerated by immersing in a 0.1 weight % $H_2SO_4$ solution for 5 hours. The saturated adsorbed amount of $PO_4^{3-}$ and $F^-$ of the adsorbent after regeneration was measured. As a result, it was almost the same as the adsorbed amount of a new product shown in [Table 1].

Test Example 2

Test Sample 2-1: Ion adsorbent (average particle diameter: 1 mm) prepared in Example 1.

Test Sample 2—2: That having an average particle diameter of 0.5 mm, obtained by crushing the ion adsorbent prepared in Example 2 in a mortar.

Test Sample 2-3: Crushed product according to the conventional procedure (average particle diameter: 0.5 mm), which was obtained by using an unsaturated polyester resin according to the description of Japanese Patent Kokai No. 118734/1981 in place of the polyvinylidene latex in Example 1, followed by curing and further crushing of the cured matter.

The above test samples (each of 25 ml) were packed respectively in a glass column having an inner diameter of 15.2 mm. A model waste solution prepared by dissolving $Na_2HPO_4 \cdot 12H_2O$ in deionized water containing 500 mg/liter of $PO_4^{3-}$ and having the pH of the solution adjusted to 3 with a dilute $H_2SO_4$ was passed through the column at a flow rate of 250 ml ($SV=10$ $h^{-1}$) and $PO_4^{3-}$ ions were adsorbed.

The $PO_4^{3-}$ concentration in an effluent solution from the column was measured by ion chromatography and passing of water was stopped at the time when the $PO_4^{3-}$ concentration in the effluent solution becomes 100 mg/liter. The adsorbent was taken out of the column and then subjected to the following regeneration. The adsorbent was immersed in a 7 weight % NaOH aqueous solution for 2 hours and, after desorbing the adsorbed $PO_4^{3-}$, the adsorbent was washed with distilled water. Then, the absorbent was regenerated by immersing in a 2 weight % $H_2SO_4$ aqueous solution for 3 hours. This adsorbent after regeneration was packed again in the column and the model waste solution was passed through. The adsorption and desorption were repeated 50 times and, furthermore, the regeneration was repeated 100 times.

An adsorption/break-through curve of a new product is as shown in [FIG. 1]. Furthermore, the adsorbed amount of $PO_4^{3-}$ was calculated from the amount of water passed through until the $PO_4^{3-}$ concentration of the outlet solution becomes 100 mg/liter, thereby affording the results of [Table 2]

TABLE 2

Adsorbed amount of $PO_4^{3-}$ (mg/g-adsorbent)

| | New product | Times of regenerations | |
|---|---|---|---|
| | | After 50 times | After 100 times |
| Test Sample 2-1: spherical product (1 mm) | 19.7 | 18.7 | 18.5 |
| Test Sample 2-2: crushed product (0.5 mm) | 43.8 | 41.7 | 41.4 |
| Test Sample 2-3: crushed product according to a conventional procedure | 15.5 | 15.4 | 15.1 |

Test Example 3

Test Sample 3-1: That having an average particle diameter of 0.5 mm, obtained by crushing the ion adsorbent prepared in Example 2.

Test Sample 3-2: Crushed product according to a conventional procedure (average particle diameter: 0.5 mm).

The above test samples (each of 25 ml) were packed respectively in a glass column having an inner diameter of 15.2 mm. A model waste solution prepared by dissolving $Na_2HPO_4 \cdot 12H_2O$ in deionized water containing 50 mg/liter of $PO_4^{3-}$ and having the pH of the solution adjusted to 3, 5 and 7 using a $H_2SO_4$ solution was passed through the column at a flow rate of 125 ml (SV=5 $h^{-1}$) and $PO_4^{3-}$ ions were adsorbed.

The $PO_4^{3-}$ concentration in the effluent solution was measured by ion chromatography and the adsorbed amount of $PO_4^{3-}$ was calculated from the amount of water passed through until the concentration of the outlet solution becomes 10 mg/liter, thereby affording the results of [Table 3].

TABLE 3

Adsorbed amount of $PO_4^{3-}$ (mg/g-adsorbent)

| | pH | | |
|---|---|---|---|
| | 3 | 5 | 7 |
| Test Sample 3-1: crushed product (0.5 mm) | 89.2 | 45.7 | 35.5 |
| Test Sample 3-2: crushed product according to a conventional procedure | 31.5 | 14.4 | 11.1 |

Test Example 4

Test Sample 4-1: Ion adsorbent (average particle diameter: 1 mm) prepared in Example 1.

Test Sample 4-2: That having an average particle diameter of 0.5 mm, obtained by crushing the ion adsorbent prepared in Example 2 in a mortar.

Test Sample 4-3: Crushed product according to a conventional procedure (average particle diameter: 0.5 mm).

The test samples (each of 25 ml) were packed respectively in a glass column having an inner diameter of 15.2 mm. A model waste solution prepared by dissolving NaF in deionized water containing 25 mg/liter of $F^-$ and having the pH of the solution adjusted to 3 with a HCl solution was passed the column at a flow rate of 250 ml (SV=10 $h^{-1}$) and $F^-$ ions were adsorbed.

The $F^-$ concentration in an effluent solution from the column was measured by ion chromatography and the adsorbed amount of $F^-$ was calculated from the amount of water passed through until the $F^-$ concentration in the effluent solution becomes 5 mg/liter, thereby affording the results of [Table 4].

TABLE 4

Adsorbed amount of $F^-$ (mg/g-adsorbent)

| | |
|---|---|
| Test Sample 4-1: spherical product (1 mm) | 15.6 |
| Test Sample 4-2: crushed product (0.5 mm) | 45.3 |
| Test Sample 4-3: crushed product according to a conventional procedure | 15.0 |

Test Example 5

Test Sample 5-1: That having an average particle diameter of 0.5 mm, obtained by crushing the ion adsorbent prepared in Example 2 in a mortar.

The above test sample (25 ml) was packed in a glass column having an inner diameter of 15.2 mm. A model waste solution prepared by dissolving NaF in deionized water containing 100 mg/liter of $F^-$ and having the pH of the solution adjusted to 3 with a HCl solution was passed the column at a flow rate of 250 ml (SV=10 $h^{-1}$) and $F^-$ ions were adsorbed.

Figure 2:
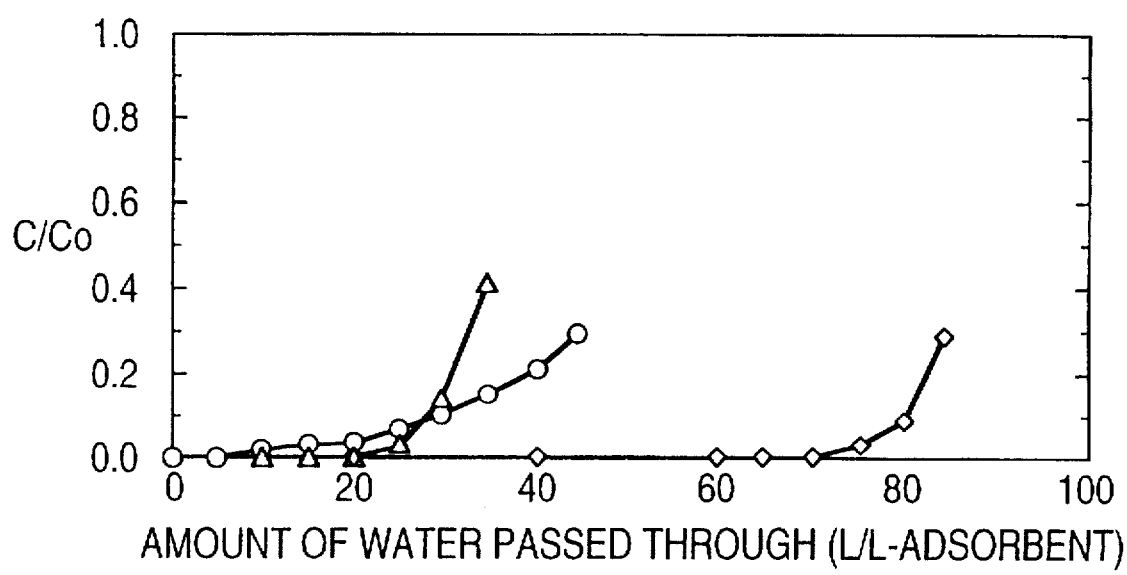
FIG. 2 is fluoride ion adsorption/break-through curves of a new and a regenerated ion adsorbents of Test Example 5.

The $F^-$ concentration in the effluent solution was measured by ion chromatography and passing of water was stopped at the time when the $F^-$ concentration in the effluent solution becomes 20 mg/liter. 25 ml of a 7 weight % NaOH solution was passed at a flow rate of 25 ml/h (SV=1 $h^{-1}$) for 1 hour and the adsorbed $F^-$ was desorbed. Then, the adsorbent was regenerated by passing 25 ml of distilled water at a flow rate of 25 ml/h (SV=1 $h^{-1}$) for 1 hour and passing a 0.1N hydrochloric acid solution at a flow rate of 25 ml/h (SV=10 $h^{-1}$) for 1 hour. The effluent solution was passed through the adsorbent again. As a result, $F^-$ ions were adsorbed in the same manner as in case of a new product [FIG. 2]. This regeneration was repeated 50 times, but no deterioration in performance was recognized.

Example 3

A spherical adsorbent having an average particle diameter of 1 mm was prepared in a similar manner to that of Example 1, except using 500 g of pulverized zirconium oxide having a particle size of 150–350 μm as nuclei instead of 500 g of the base adsorbent powder (1) employed in Example 1. The adsorbent thus obtained shows almost the same adsorption workability as that of the adsorbent produced in Example 1.

Example 4

A spherical adsorbent having an average particle diameter of 2 mm was prepared in a similar manner to that of Example 1, except using pulverized zirconium oxide having a particle size of 500–700 μm as nuclei instead of 500 g of the base adsorbent powder (1) employed in Example 1. The adsorbent thus obtained shows almost the same adsorption workability as that of the adsorbent produced in Example 1.

EFFECT OF THE INVENTION

By using a polymer containing a dichloroethylene structure derived from a vinylidene chloride monomer in the molecule in place of an unsaturated polyester and an urethane resin, there can be obtained an excellent adsorbent which has improved workability in case of granulation and high strength, and causes little deterioration of its ion exchange capacity even after a large number of regenerations.

What we claimed is:

1. An ion adsorbent, which comprises at least one hydrated ferrite of titanium, zirconium or tin, or a mixture thereof, and a polymer having a dichloroethylene structure derived from a vinylidene chloride monomer in the molecule.

2. The ion adsorbent as claimed in claim 1, wherein the composition further comprises at least one oxide hydrate of titanium, zirconium, tin or iron.

3. The ion adsorbent as claimed in claim 1 or 2, wherein the proportion of the polymer in the ion adsorbent is from 5 to 50% by weight.

4. The ion adsorbent as claimed in claim 1 to 2, wherein the content of the dichloroethylene moiety in the polymer molecule is from 30 to 99% by weight.

5. The process of using the ion adsorbent as claimed in claim 1 or 2 to adsorb phosphate ion and/or fluoride ion.

6. The ion adsorbent as claimed in claim 1 or 2, wherein the composition is cured at 25–120° C.

7. The ion adsorbent as claimed in claim 1 or 2, which has a spherical form.

8. A method for regenerating an ion adsorbent, which comprises treating the ion adsorbent of claim 1 having absorbed ion with an aqueous alkaline solution.

9. A method of producing an ion absorbent, which comprises:

preparing a composition comprising at least one hydrated ferrite of titanium, zirconium or tin, or a mixture thereof, and a polymer having a dichloroethylene structure derived from a vinylidene chloride monomer in the molecule, and curing the composition.

10. The method as claimed in claim 9, wherein the composition further comprises at least one oxide hydrate of titanium, zirconium, tin or iron.

11. The method as claimed in claim 9, wherein the proportion of the polymer in the ion adsorbent is from 5 to 50% by weight.

12. The method as claimed in claim 9, wherein the content of the dichloroethylene moiety in the polymer molecule is from 30 to 99% by weight.

13. The method as claimed in claim 9, which is used for adsorption of phosphate ion and/or fluoride ion.

14. The method as claimed in claim 9, wherein the composition is cured at 25–120° C.

15. An ion adsorbent, which is prepared by curing a composition comprising at least one hydrated ferrite of titanium, zirconium or tin, and a polymer having a dichloroethylene structure derived from a vinylidene chloride monomer in the molecule.

* * * * *